United States Patent
Liu et al.

(10) Patent No.: US 8,179,761 B2
(45) Date of Patent: May 15, 2012

(54) FILTER AND FILTERING METHOD THEREOF

(75) Inventors: Shih-Hsien Liu, Hsinchu (TW); Zhieng-Chung Chen, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 48 days.

(21) Appl. No.: 12/701,620

(22) Filed: Feb. 8, 2010

(65) Prior Publication Data
US 2011/0128834 A1 Jun. 2, 2011

(30) Foreign Application Priority Data
Nov. 27, 2009 (TW) ............................... 98140642 A

(51) Int. Cl.
*G11B 7/00* (2006.01)
(52) U.S. Cl. .................................... 369/53.35
(58) Field of Classification Search .................. None
See application file for complete search history.

(56) References Cited

U.S. PATENT DOCUMENTS

| | | | | |
|---|---|---|---|---|
| 5,331,615 | A * | 7/1994 | Yamada et al. | 369/44.32 |
| 7,321,531 | B2 * | 1/2008 | Park et al. | 369/47.24 |
| 7,446,685 | B1 * | 11/2008 | Kikugawa et al. | 341/142 |
| 2005/0265185 | A1 * | 12/2005 | Kashihara et al. | 369/47.55 |
| 2007/0280088 | A1 * | 12/2007 | Lin et al. | 369/124.1 |

* cited by examiner

*Primary Examiner* — Peter Vincent Agustin
*Assistant Examiner* — Emily Frank
(74) *Attorney, Agent, or Firm* — Jianq Chyun IP Office

(57) ABSTRACT

A filter, including a direct-current (DC) tracking unit, a subtracter and a control unit, is provided. The DC tracking unit extracts a DC component of a radio-frequency (RF) signal and accordingly generates a level signal. The subtracter subtracts the level signal from the RF signal to generate a RF coupling signal. The control unit determines whether to transmit a setting signal to the DC tracking unit according to the level variation of the RF coupling signal, so as to adjust a characteristic parameter of the DC tracking unit.

14 Claims, 5 Drawing Sheets

FILTER AND FILTERING METHOD THEREOF

CROSS-REFERENCE TO RELATED APPLICATION

This application claims the priority benefit of Taiwan application serial no. 98140642, filed Nov. 27, 2009. The entirety of the above-mentioned patent application is hereby incorporated by reference herein and made a part of specification.

BACKGROUND OF THE INVENTION

1. Field of the Invention

The invention generally relates to a filter and a filter method, and more particularly to a filter and a filter method of an optical storage system.

2. Description of Related Art

With regards to an optical storage system, a servo controller adjusts characteristic parameters as well as performs data determinations according to a focus error (FE) signal, a tracking error (TE) signal, and a radio frequency (RF) signal generated by a photo sensor on an optical pickup head. The RF signal generated by the photo sensor is first processed by a filter, then provided to a back-end data loop, so that a modulated signal is demodulated.

FIG. 1 is a schematic block diagram of a filter for a conventional optical storage system. Referring to FIG. 1, a filter 100 includes a direct-current (DC) tracking unit 110 and a subtracter 120. During filter operation, a DC tracking unit 110 extracts a DC component of a RF signal RF_IN1 detected by the photo sensor, so as to generate a level signal RF_DC1. Thereafter, a subtracter 120 subtracts the level signal RF_DC1 from the RF signal RF_IN1, so as to generate a RF coupling signal RF_OUT1. That is, RF_OUT1=RF_IN1−RF_DC1. Accordingly, a back-end data loop 101 demodulates the RF coupling signal RF_OUT1, so as to generate a modulated signal.

It should be noted that, FIG. 2 is a timing diagram of the signals for the filter depicted in FIG. 1. Referring to FIGS. 1-2, when a variation in a DC level of the RF signal RF_IN1 is generated, for instance at a time reference t11 shown in FIG. 2, the DC tracking unit 110 is limited by a bandwidth thereof, and the DC component may not be extracted in time. Moreover, when the RF signal RF_IN1 returns to normal in a next instant, for instance at a time reference t12 shown in FIG. 2, the DC tracking unit 110 cannot react in time. Consequently, the level signal RF_DC1 cannot return to a normal level instantaneously. At this time, a variation phenomenon of the RF coupling signal RF_OUT1 occurs at a label 210 in FIG. 2, for example.

In other words, to prevent conventional filters from generating a large jitter after a normal RF signal RF_IN1 is processed by the DC tracking unit 110, the bandwidth of the DC tracking unit 110 is typically kept low. However, when the aforementioned phenomenon occurs in the RF signal RF_IN1, the RF coupling signal RF_OUT1 is usually distorted due to the insufficient bandwidth of the DC tracking unit 110. Therefore, a disk reading ability of the optical storage system may be affected.

SUMMARY OF THE INVENTION

An aspect of the invention provides a filter for preventing a distortion of a RF coupling signal when a DC level variation is generated in a RF signal, by adjusting a characteristic parameter of the DC tracking unit.

Another aspect of the invention provides a filtering method for accurately removing a DC level variation in the RF signal when the DC level variation of the RF signal is generated, by using a setting signal to adjust a characteristic parameter of the DC tracking unit.

The invention as embodied and broadly described herein provides a filter, including a DC tracking unit, a subtracter, and a control unit. The DC tracking unit extracts a DC component of a RF signal and accordingly generates a level signal. The subtracter subtracts the level signal from the RF signal, so as to generate a RF coupling signal. Additionally, by referencing a level variation of the RF coupling signal, the control unit determines whether to transmit a setting signal to the DC tracking unit, so as to adjust a characteristic parameter of the DC tracking unit.

In an embodiment of the invention, the aforementioned control unit includes a comparator and a DC protection unit. Herein, the comparator compares a level of the RF coupling signal by referencing a reference signal, and accordingly the comparator generates a comparison signal. Moreover, the DC protection unit counts the comparison signal by referencing a clock signal, so as to obtain a count value. Furthermore, the DC protection unit determines whether a value of the count value falls outside of a predetermined count range, and when the value of the count value falls outside of the predetermined count range, the setting signal is transmitted to the DC tracking unit.

From another perspective, the invention as embodied and broadly described herein provides a filtering method adapted for a filter in an optical storage system, the filter including a DC tracking unit and a subtracter, and the filtering method includes the steps as follows. First, a DC component of a RF signal is extracted by using the DC tracking unit, and thereby a level signal is accordingly generated. Next, the level signal is subtracted from the RF signal by using the subtracter, so as to generate a RF coupling signal. Moreover, by referencing a level variation of the RF coupling signal, whether to transmit a setting signal to the DC tracking unit is determined, so as to adjust a characteristic parameter of the DC tracking unit.

In summary, the invention as embodied and broadly described herein determines whether to transmit a setting signal to the DC tracking unit according to the level variation of the RF coupling signal. Accordingly, when a DC level variation is generated in the RF signal, the DC tracking unit may adjust a characteristic parameter thereof according to the setting signal received, thereby accurately removing the DC level variation in the RF signal. On the other hand, when the DC level of the RF signal returns to normal, the characteristic parameter of the DC tracking unit is switched to a normal value. Therefore, when compared to a conventional technique, an embodiment of the invention may prevent a distortion of the RF coupling signal due to an insufficient bandwidth of the DC tracking unit.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
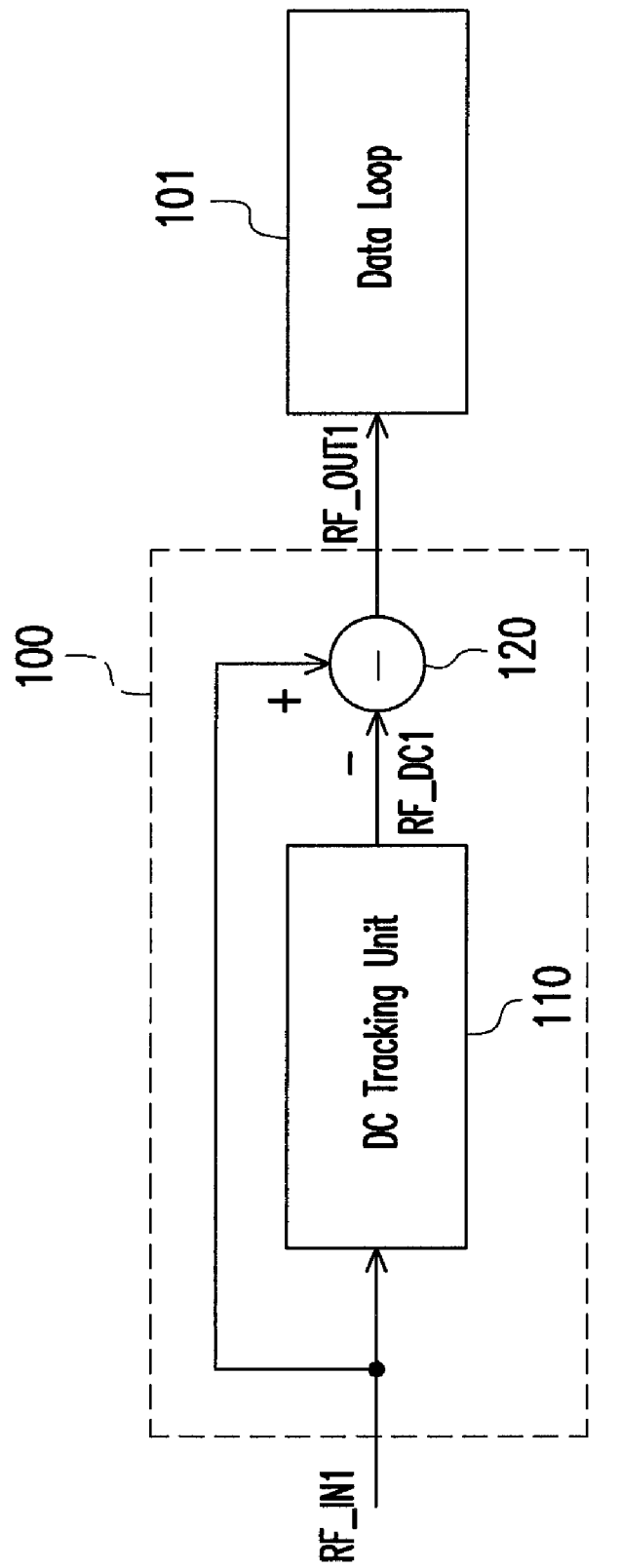
FIG. 1 is a schematic block diagram of a filter for a conventional optical storage system.
Figure 2:
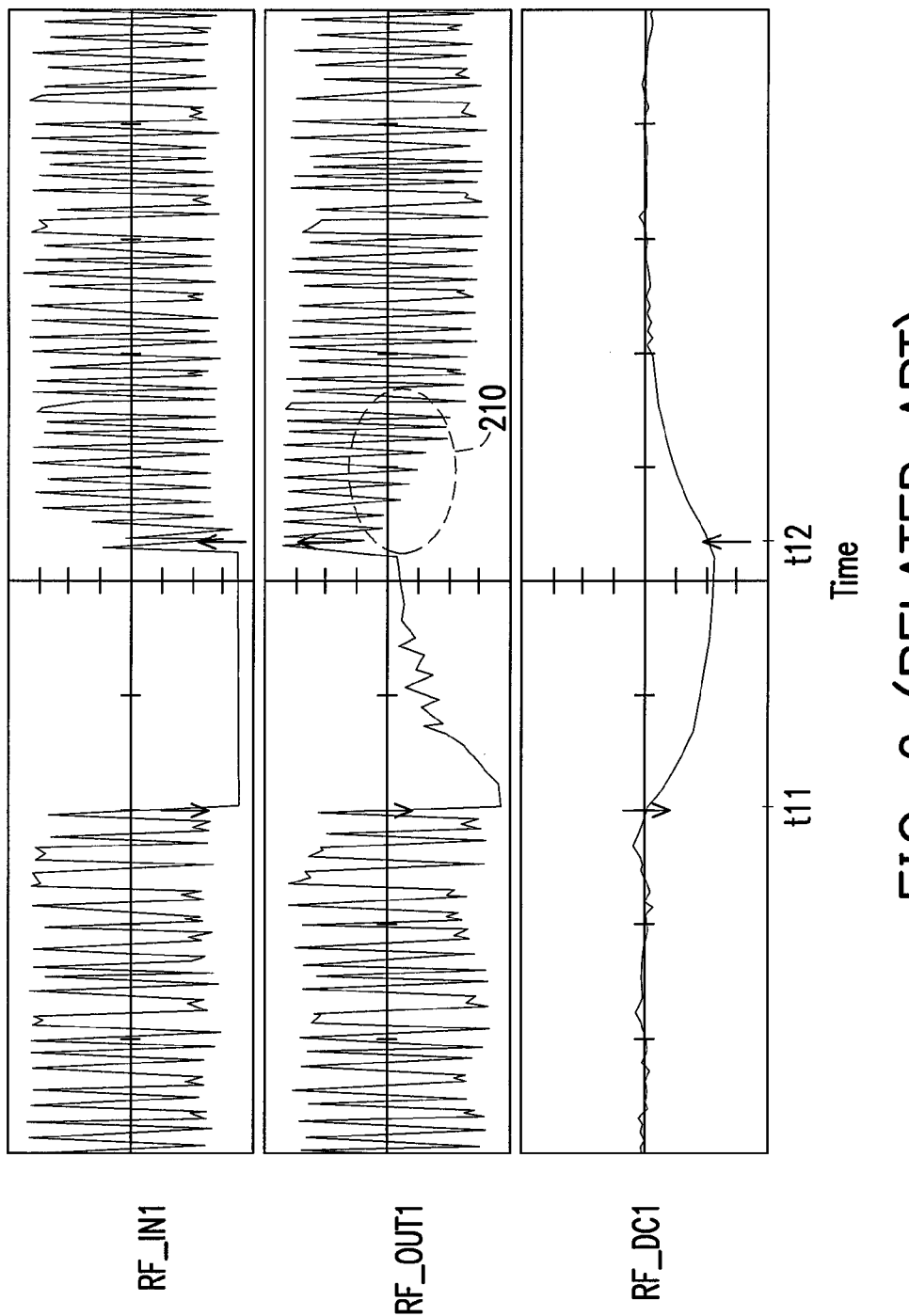
FIG. 2 is a timing diagram of the signals of the filter depicted in FIG. 1.
Figure 3:
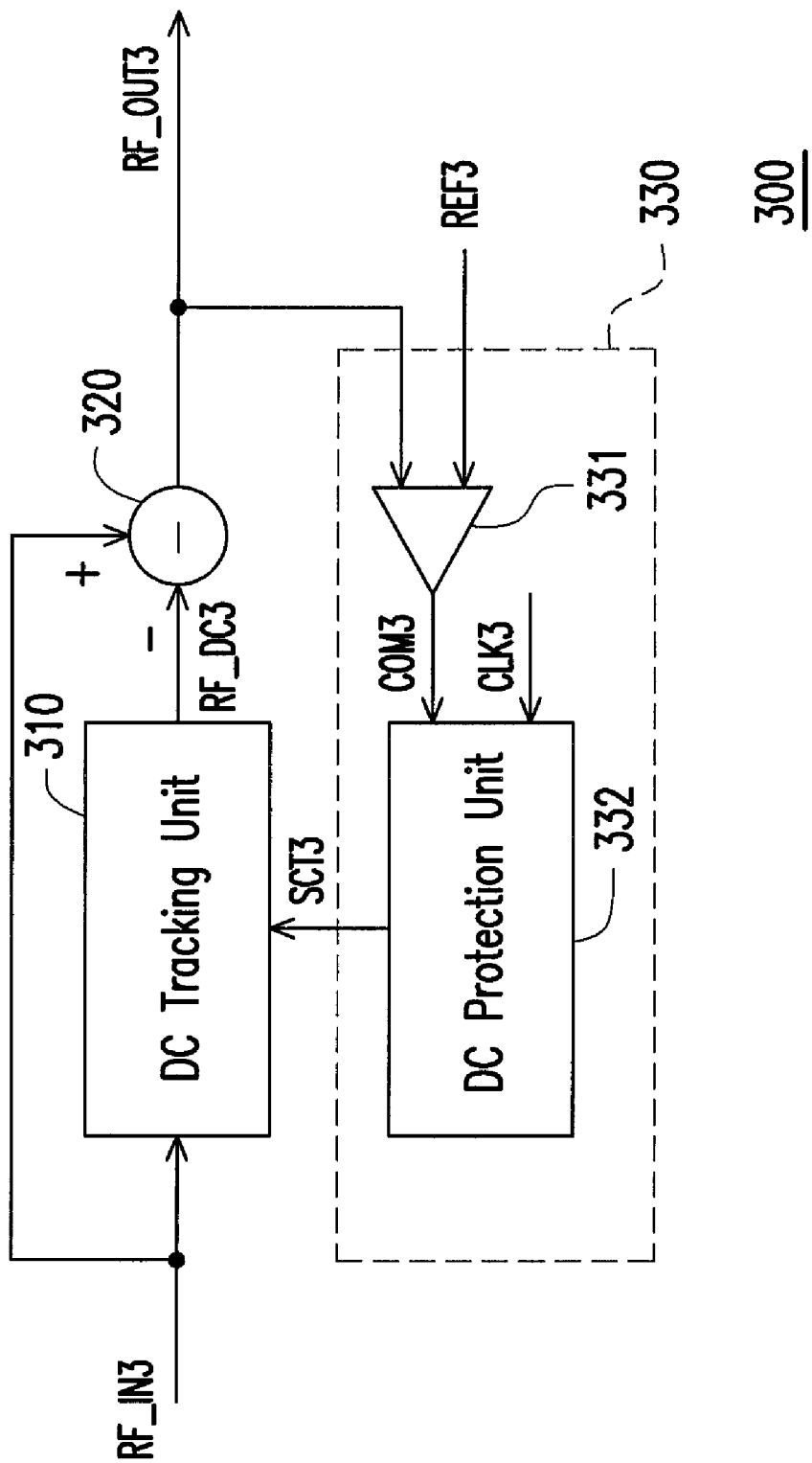
FIG. 3 is a schematic block diagram of a filter in accordance with an embodiment of the invention.

FIG. 3 is a schematic block diagram of a filter in accordance with an embodiment of the invention. Referring to FIG. 3, a filter 300 includes a DC tracking unit 310, a subtracter 320, and a control unit 330. The control unit 330 includes a comparator 331 and a DC protection unit 332. Since the filter 300 is adapted for an optical storage system, the filter 300 receives a RF signal RF_IN3 of the optical storage system. Moreover, the subtracter 320 is coupled to the DC tracking unit 310, and the DC protection unit 332 is coupled between the subtracter 320 and the DC tracking unit 310.

During operation, the DC tracking unit 310 has an adjustable characteristic parameter. For example, a tracking speed. When the RF signal RF_IN3 is transmitted to the filter 300, the DC tracking unit 310 extracts the DC component of the RF signal RF_IN3 in accordance to the tracking speed thereof and accordingly generates a level signal RF_DC3. In addition, the subtracter 320 receives the RF signal RF_IN3 and the level signal RF_DC3, and subtracts the level signal RF_DC3 from the RF signal RF_IN3, so as to generate a RF coupling signal RF_OUT3. Moreover, the RF coupling signal RF_OUT3 is fed back to the control unit 330.

In the control unit 330, the comparator 331 references a reference signal REF3 to compare a level variation of the RF coupling signal RF_OUT3, and the comparator 331 accordingly generates a comparison signal COM3. Furthermore, the DC protection unit 332 references a clock signal CLK3 to count the comparison signal COM3, so as to obtain a count value. It should be noted that, when a value of the count value is outside of a predetermined range, the DC protection unit 332 generates a setting signal SCT3. At this time, the DC tracking unit 310 references the setting signal SCT3 so as to adjust the characteristic parameter thereof. For example, the tracking speed is adjusted in order to correctly remove the DC component of the RF signal RF_IN3, so as to avoid a distortion of the RF coupling signal RF_OUT3.

Figure 4:
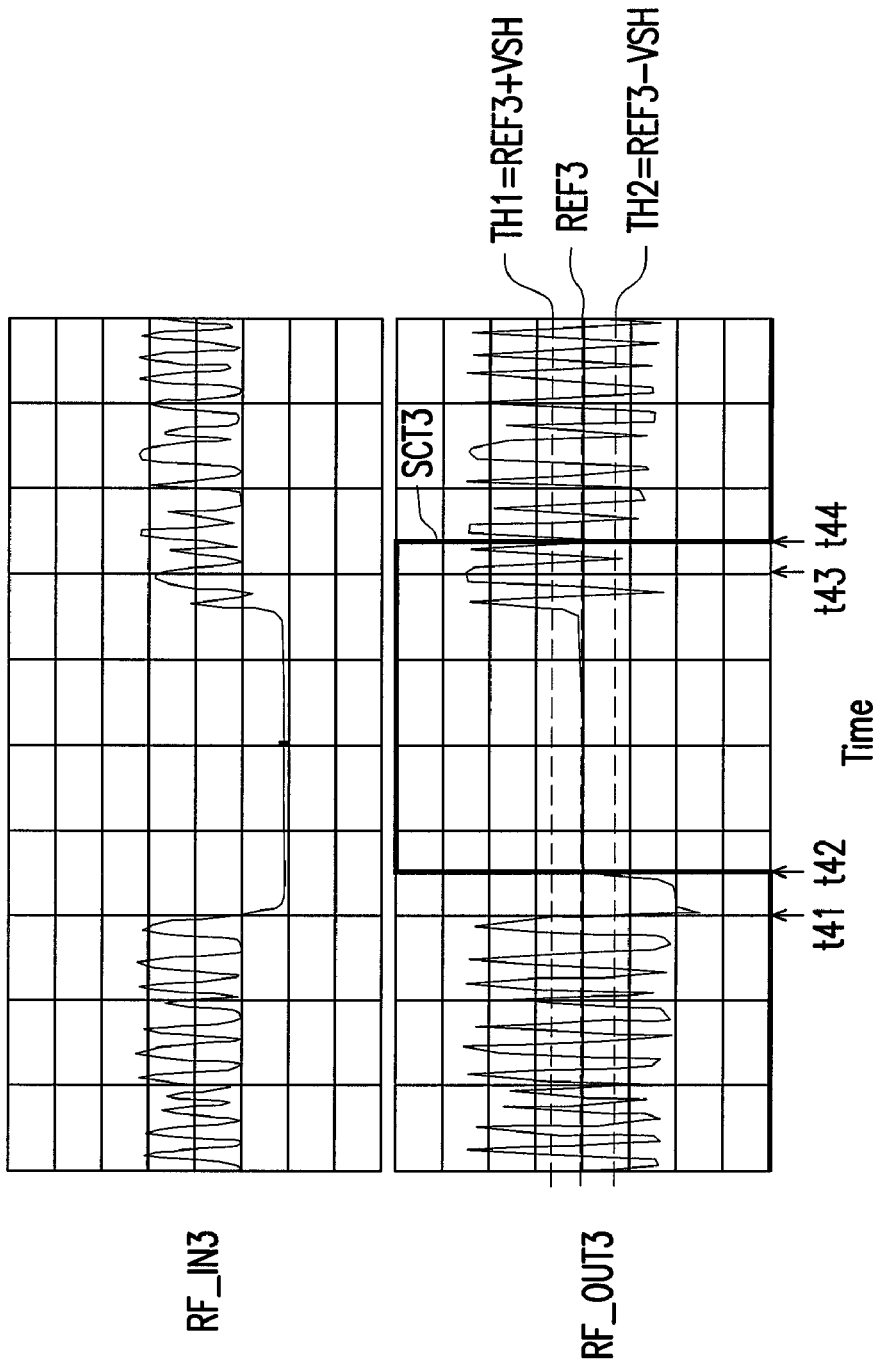
FIG. 4 is a timing diagram of the signals of the filter depicted in FIG. 3.

As an example, FIG. 4 is a timing diagram of the signals of a filter depicted in FIG. 3. As shown in FIG. 4, a DC level of the RF signal RF_IN3 respectively produces a variation and returns to normal at a time reference t41 and at a time reference t43. Moreover, a reference signal REF3 labeled in FIG. 4 is a reference voltage of the optical storage system (e.g., 2.1 V). Referring to FIG. 3-4, in regards to the comparator 331, since a noise component may be present in the RF coupling signal RF_OUT3, thus in order to prevent a misjudgment of the RF coupling signal RF_OUT3 by the comparator 331, the comparator 331 references the references signal REF3 to set a threshold range. Herein, the comparator 331 adds a predetermined shift value VSH to the reference signal REF3 to obtain a threshold value TH1. Additionally, the comparator 331 subtracts the predetermined shift value VSH from the reference signal REF3 to obtain a threshold value TH2. In other words, TH1=REF3+VSH and TH2=REF3−VSH.

When the RF coupling signal RF_OUT3 is larger than the threshold value TH1, that is, when the RF coupling signal RF_OUT3 is higher than the reference signal REF3 by a predetermined shift value VSH, the comparator 331 switches the comparison signal COM3 to a first level, for example logic 1. Moreover, at this time the DC protection unit 332 begins counting the count value. Conversely, when the RF coupling signal RF_OUT3 is smaller than the threshold value TH2, that is, when the RF coupling signal RF_OUT3 is lower than the reference signal REF3 by a predetermined shift value VSH, the comparator 331 switches the comparison signal COM3 to a second level, for example logic 0. Moreover, at this time the DC protection unit 332 resets the count value. In other words, the DC protection unit 332 initializes the count value to 0 and recounts the count value.

According to the above-described steps, since a variation in the DC level of the RF coupling signal RF_IN3 has not been generated before the time reference t41, therefore a level of the comparison signal COM3 generated by the comparator 331 is switched from a first level to a second level in a shorter time period. In other words, before the time reference t41, since the count value counted by the DC protection unit 332 is reset to 0 in a shorter time period, therefore the count value falls within a predetermined count range. For example, if a frequency of the clock signal CLK3 is two times a channel bit rate (e.g., 1T) of the optical storage system, and a normal signal frequency of a digital compact disk (DVD) is approximately between 3T-14T, then before the time reference t41, the count value counted by the DC protection unit 332 falls within 6-28.

Moreover, when the DC level of the RF signal RF_IN3 generates the variation at the time reference t41, the RF coupling signal RF_OUT3 is maintained at a low level between the time references t41 and t42 in accordance with the variation of the DC level of the RF signal RF_IN3. At this time, since the level of the comparison signal COM3 is not switched from the first level to the second level within a short time period, therefore the count value counted by the DC protection unit 332 falls outside of the predetermined count range. At this time, the DC protection unit 332 generates the setting signal SCT3, thereby increasing the tracking speed of the DC tracking unit 310, and accurately removing the DC level variation in the RF signal RF_IN3. In other words, in an initial variation period for the DC level of the RF signal RF_IN3, the DC protection unit 332 generates the setting signal SCT3 due to the count value being outside of the predetermined count range (e.g., the count value falling outside of 28), so as to increase the tracking speed of the DC tracking unit 310.

When the DC level of the RF signal RF_IN3 returns to normal at the time reference t43, the level of the comparison signal COM3 is again capable of being switched from the first level to the second level within the shorter time period. Therefore, at this time the count value falls within the predetermined count range (e.g., the count value falls within 6-28). Accordingly, the DC protection unit 332 references the count value which falls within the predetermined count range, and ceases to generate the setting signal SCT3 at the time reference t44, so as to switch the tracking speed of the DC tracking unit 310 to a normal value.

In other words, in the initial variation period for the DC level of the RF signal RF_IN3, the DC tracking unit 310 increases the tracking speed thereof due to the setting signal SCT3 received, and thereby accurately removes the DC level variation in the RF signal RF_IN3 SCT3 due to the count value being outside of the predetermined count range, so as to prevent the distortion of the RF coupling signal RF_OUT3. Moreover, when the DC level of the RF signal RF_IN3 returns to normal, the tracking speed of the DC tracking unit 310 is switched to the normal value, so as to prevent large jitter from being generated in the RF coupling signal RF_OUT3.

Figure 5:
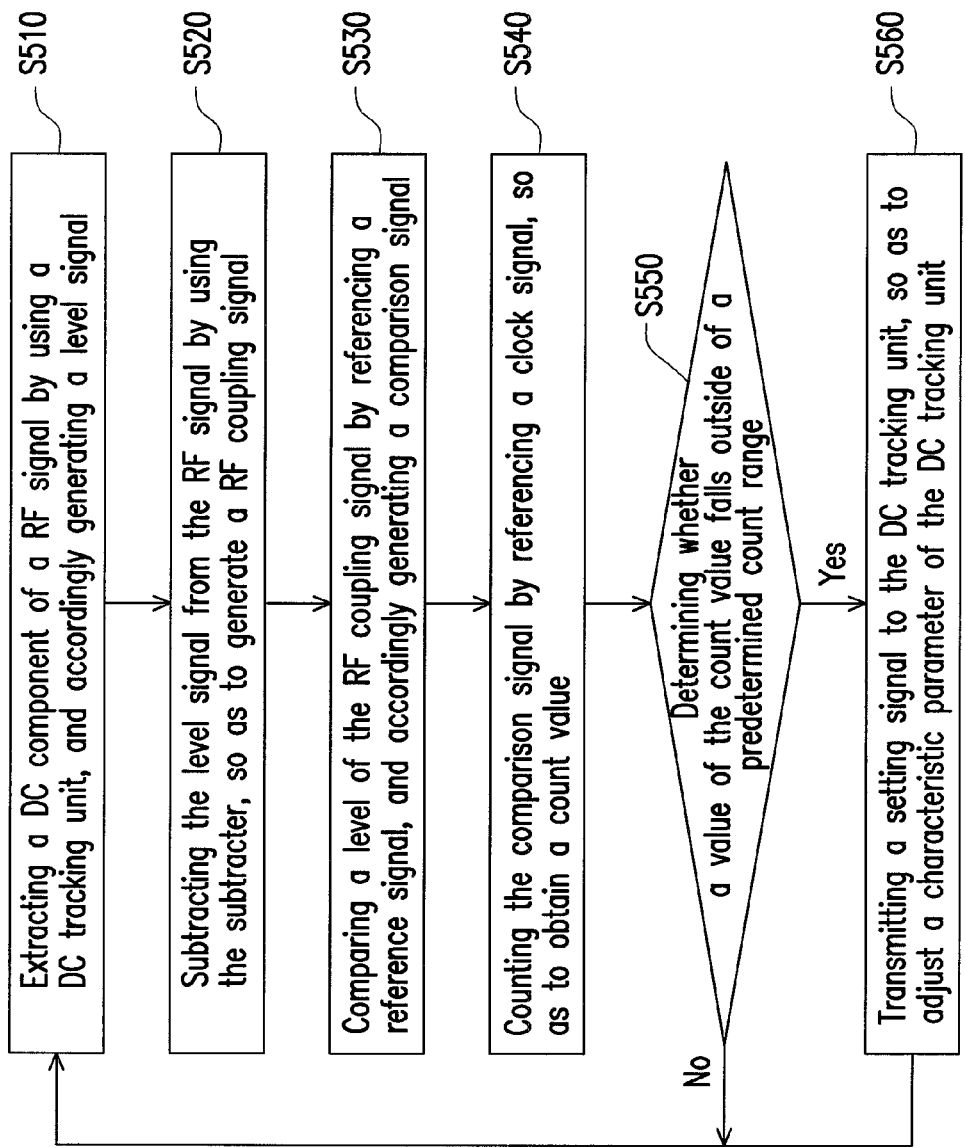
FIG. 5 is a flowchart illustrating the steps of a filtering method in accordance with an embodiment of the invention.

From another perspective, FIG. 5 is a flowchart illustrating the steps of a filtering method in accordance with an embodiment of the invention. Referring to FIG. 5, in a step S510, first a DC component of a RF signal is extracted by a DC tracking unit, and accordingly a level signal is generated. Thereafter, in a step S520, a subtracter is used to subtract the level signal from the RF signal so as to generate a RF coupling signal.

Additionally, in the steps S530-S560, by referencing a level variation of the RF coupling signal, whether to transmit a setting signal to the DC tracking unit is determined, so as to adjust a characteristic parameter of the DC tracking unit. In the step S530, a reference signal is referenced to compare a level of the RF coupling signal, and accordingly generate a comparison signal. Thereafter, in the step S540, a clock signal is referenced to count the comparison signal, so as to obtain a count value. Furthermore, the value of the count value is addressed in the step S550, in which whether the value of the count value falls outside of a predetermined count range is determined, and when the value of the count value falls outside of the predetermined count range, the setting signal is transmitted to the DC tracking unit (Step S560). Details of the filtering method in accordance with this embodiment have been described in the aforementioned embodiments and therefore not repeated hereinafter.

In light of the foregoing, according to the invention as embodied and broadly described herein, by using the control unit to compare the level variation of the RF coupling signal, when a DC level variation is generated in the RF signal, a setting signal is transmitted to the DC tracking unit. According to the setting signal received, the DC tracking unit may increase the tracking speed thereof, thereby accurately removing the DC level variation in the RF signal. On the other hand, when the DC level of the RF signal returns to normal, the tracking speed of the DC tracking unit is switched to the normal value, so as to prevent a large jitter from being generated in the RF coupling signal.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A filter adapted for an optical storage system, comprising:
 a direct-current (DC) tracking unit, configured to extract a DC component of a radio-frequency (RF) signal and accordingly generating a level signal;
 a subtracter, configured to subtract the level signal from the RF signal, so as to generate a RF coupling signal; and
 a control unit, coupled between the subtracter and the DC tracking unit, configured to determine whether to transmit a setting signal to the DC tracking unit according to a level variation of the RF coupling signal, so as to adjust a characteristic parameter of the DC tracking unit.

2. The filter as claimed in claim 1, wherein the control unit comprises:
 a comparator, referencing a reference signal to compare a level of the RF coupling signal, and accordingly generating a comparison signal; and
 a DC protection unit, referencing a clock signal to count the comparison signal, so as to obtain a count value, and the DC protection unit further determining whether a value of the count value falls outside of a predetermined count range, in order to transmit the setting signal to the DC tracking unit when the value of the count value falls outside of the predetermined count range.

3. The filter as claimed in claim 2, wherein the reference signal is a reference voltage of the optical storage system.

4. The filter as claimed in claim 2, wherein a frequency of the clock signal correlates to a channel bit rate of the optical storage system.

5. The filter as claimed in claim 2, wherein when the RF coupling signal is higher than the reference signal by a predetermined shift value, the comparator switches the comparison signal to a first level, and when the RF coupling signal is lower than the reference signal by the predetermined shift value, the comparator switches the comparison signal to a second level.

6. The filter as claimed in claim 5, wherein when the comparison signal is switched to the first level, the DC protection unit counts the count value, and when the comparison signal is switched to the second level, the DC protection unit resets the count value.

7. The filter as claimed in claim 1, wherein the characteristic parameter is a tracking speed of the DC tracking unit, and the tracking unit adjusts the tracking speed according to the setting signal.

8. A filtering method adapted for a filter in an optical system, the filter comprising a DC tracking unit and a subtracter, the filtering method comprising:
 extracting a DC component of a RF signal by using the DC tracking unit, and accordingly generating a level signal;
 subtracting the level signal from the RF signal by using the subtracter, so as to generate a RF coupling signal; and
 determining whether to transmit a setting signal to the DC tracking unit by referencing the level variation of the RF coupling signal, so as to adjust a characteristic parameter of the DC tracking unit.

9. The filtering method as claimed in claim 8, wherein the step of determining whether to transmit the setting signal to the DC tracking unit by referencing the level variation of the RF coupling signal comprises:
 comparing a level of the RF coupling signal by referencing a reference signal, and accordingly generating a comparison signal;
 counting the comparison signal by referencing a clock signal, so as to obtain a count value;
 determining whether a value of the count value falls outside of a predetermined count range; and
 transmitting the setting signal to the DC tracking unit when the value of the count value falls outside of the predetermined count range.

10. The filtering method as claimed in claim 9, wherein the reference signal is a reference voltage of the optical storage system.

11. The filtering method as claimed in claim 9, wherein a frequency of the clock signal correlates to a channel bit rate of the optical storage system.

12. The filtering method as claimed in claim 9, wherein the step of comparing the level of the RF coupling signal by referencing the reference signal, and accordingly generating the comparison signal comprises:
 switching the comparison signal to a first level when the RF coupling signal is higher than the reference signal by a predetermined shift value; and
 switching the comparison signal to a second level when the RF coupling signal is lower than the reference signal by the predetermined shift value.

13. The filtering method as claimed in claim 12, wherein the step of counting the comparison signal by referencing the clock signal, so as to obtain the count value comprises:
   counting the count value when the comparison value is switched to the first level; and
   resetting the count value when the comparison value is switched to the second level.

14. The filtering method as claimed in claim 8, wherein the characteristic parameter is a tracking speed of the DC tracking unit, and the step of adjusting the characteristic parameter of the tracking unit comprises:
   changing the tracking speed of the DC tracking unit according to the setting signal.

* * * * *